United States Patent Office 3,787,399
Patented Jan. 22, 1974

3,787,399
3,4-DIHYDRO - 1 - METHYLPYRAZINO[1,2-b]-1,2-BENZOTHIAZIN-11(2H)-ONE 6,6-DIOXIDES
Chris Royce Rasmussen, Ambler, Pa., assignor to McNeil Laboratories, Inc.
No Drawing. Filed Oct. 2, 1972, Ser. No. 294,117
Int. Cl. C07d 93/02
U.S. Cl. 260—243 R      2 Claims

ABSTRACT OF THE DISCLOSURE

The compounds herein are 3,4-dihydro-1-methylpyrazino[1,2-b] - 1,2 - benzothiazin-11(2H)-one 6,6-dioxides, useful for their ultra-violet absorbing properties.

This invention relates to novel 3,4-dihydro-1-methylpyrazino[1,2-b] - 1,2-benzothiazin-11(2H)-one 6,6-dioxides and the preparation thereof. Said compounds may be represented structurally as follows:

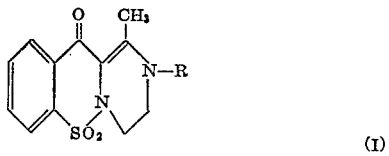

where R is hydrogen, loweralkyl, hydroxy loweralkyl, cyano loweralkyl, or phenyl loweralkyl. As used herein "loweralkyl" may be straight or branch chained saturated aliphatic hydrocarbons having from one to about 5 carbon atoms, such as, methyl, ethyl, propyl, isopropyl, butyl, pentyl, and the like. In the preferred embodiment, R is hydrogen.

The compounds of Formula I are prepared by the reaction of 3-acetyl-4-hydroxy-2H-1,2-benzothiazine 1,1-dioxide (II) [see H. Zinnes et al., J. Org. Chem., 30, 2241 (1965)] with a molar equivalent or a slight molar excess of an aziridine of the formula

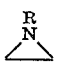

wherein R is a member selected from the group consisting of hydrogen, loweralkyl, 2-hydroxyethyl, 2-cyanoethyl, and β-phenethyl. The reaction is conducted in a suitable organic solvent such as, for example, a lower alkanol, e.g., methanol, ethanol, propanol, isopropanol, butanol, and the like; an ether, e.g., ethyl ether, tetrahydrofuran, dioxane, and the like; dimethylformamide; dimethylsulfoxide; and the like. This reaction may be illustrated as follows:

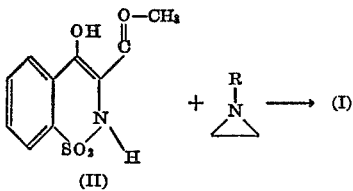

The compounds of this invention absorb ultraviolet (U.V.) light and are useful as U.V. screening materials. For example, the compound of Formula I wherein R is hydrogen has $\epsilon = 10{,}700$ at $\lambda = 383$ nm. Because of their general solubility in organic materials, they may be used as U.V.-absorbers in plastics and resins, such as, for example, polystyrene, polyethylene, polyacrylics (e.g., methacrylate resins, polyacrylamides, polyacrylonitrile fibers, etc.), polyamide (e.g. nylon) fibers, and polyester fibers. The inclusion of about 0.01–5.0 percent of the absorber, based on the polymer weight, is usually sufficient to render protection against U.V. light, such as in plastic films, filters, etc. The absorbers may be incorporated into the mixture of monomers before polymerization to form the polymer or they may be incorporated into the polymer at other stages during its handling, as by milling into the polymer together with other compounding ingredients, or during the spinning of the polymer into fibers, etc.

The following examples are intended to illustrate, but not to limit, the scope of the present invention.

EXAMPLE I 3,4-dihydro-1-methylpyrazino[1,2-b]-1,2-benzothiazin-11(2H)-one 6,6-dioxide A solution of 23.9 g. (0.1 mole) of 3-acetyl-4-hydroxy-2H-1,2-benzothiazine 1,1-dioxide in 100 ml. of dimethylformamide is stirred while 4.3 g. (0.1 mole) of aziridine is added. After the reaction mixture is heated on a steam bath for one hour, the solvent is removed in vacuo to give a thick, dark tar. Trituration of this tar with acetone yields a small crop of solid, which is collected after being allowed to stand for 15 hours. The product is twice recrystallized from water-dimethylsulfoxide to give the product, 3,4-dihydro-1-methylpyrazino[1,2-b]-1,2-benzothiazin-11(2H)-one 6,6-dioxide, as a yellow solid, M.P. 285° C. (dec.).

Analysis.—Calcd. for $C_{12}H_{12}N_2O_3S$ (percent): C, 54.53; H, 4.58; N, 10.60; S, 12.13. Found (percent): C, 54.09; H, 4.79; N, 10.21, 10.41; S, 12.16.

EXAMPLE II

The procedure of Example I is repeated except that an equivalent amount each of N-hydroxyethyl-, N-phenethyl-, N-cyanoethyl-, and N-ethyl-aziridine is used in place of the unsubstituted aziridine used therein to yield, as respective products:

3,4-dihydro-2-hydroxyethyl-1-methylpyrazino[1,2-b]-1,2-benzothiazin-11(2H)-one 6,6-dioxide;
3,4-dihydro-1-methyl-2-phenethylpyrazino[1,2-b]-1,2-benzothiazin-11(2H)-one 6,6-dioxide;
3,4-dihydro-2-cyanoethyl-1-methylpyrazino[1,2-b]-1,2-benzothiazin-11(2H)-one 6,6-dioxide; and
3,4-dihydro-2-ethyl-1-methylpyrazino[1,2-b]-1,2-benzothiazin-11(2H)-one 6,6-dioxide.

What is claimed is:
1. A 3,4 - dihydro-1-methylpyrazino[1,2-b]-1,2-benzothiazin-11(2H)-one 6,6-dioxide having the formula:

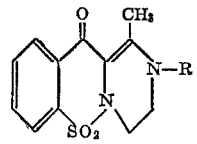

wherein R is hydrogen, loweralkyl, cyano loweralkyl, hydroxy loweralkyl, or phenyl loweralkyl.
2. 3,4-dihydro - 1 - methylpyrazino[1,2-b]-1,2-benzothiazin-11(2H)-one 6,6-dioxide.

References Cited
UNITED STATES PATENTS
3,408,347   10/1968   Shavel et al. _____ 260—243

JOHN M. FORD, Primary Examiner

U.S. Cl. X.R.
260—45.8 SN; 252—300; 117—33.3

UNITED STATES PATENT OFFICE
CERTIFICATE OF CORRECTION

Patent No. 3,787,399      Dated January 22, 1974

Inventor(s) Chris Royce Rasmussen

It is certified that error appears in the above-identified patent and that said Letters Patent are hereby corrected as shown below:

In Column 1, Formula II, the formula should read

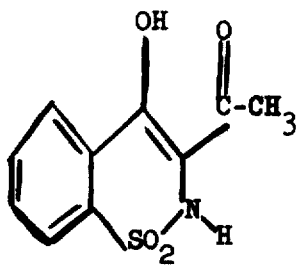

Signed and sealed this 30th day of July 1974.

(SEAL)
Attest:

McCOY M. GIBSON, JR.
Attesting Officer

C. MARSHALL DANN
Commissioner of Patents